United States Patent
Chang

(10) Patent No.: US 9,025,272 B1
(45) Date of Patent: May 5, 2015

(54) SHOCK PROTECTION FOR ELECTRO-MECHANICAL DEVICES OF HOST DEVICES EMPLOYING INERTIAL NAVIGATION SYSTEMS

(75) Inventor: Benjamin M. Chang, Cupertino, CA (US)

(73) Assignee: Seagate Technology LLC, Cupertino, CA (US)

( * ) Notice: Subject to any disclaimer, the term of this patent is extended or adjusted under 35 U.S.C. 154(b) by 2373 days.

(21) Appl. No.: 11/429,421

(22) Filed: May 5, 2006

Related U.S. Application Data

(60) Provisional application No. 60/678,418, filed on May 6, 2005.

(51) Int. Cl.
G11B 21/02 (2006.01)
G11B 21/12 (2006.01)

(52) U.S. Cl.
CPC ........................................ G11B 21/12 (2013.01)

(58) Field of Classification Search
None
See application file for complete search history.

(56) References Cited

U.S. PATENT DOCUMENTS

| 4,862,298 | A | * | 8/1989 | Genheimer et al. | 360/60 |
|---|---|---|---|---|---|
| 5,227,929 | A | * | 7/1993 | Comerford | 360/75 |
| 5,809,520 | A | * | 9/1998 | Edwards et al. | 711/115 |
| 6,061,751 | A | * | 5/2000 | Bruner et al. | 710/74 |
| 6,496,362 | B2 | * | 12/2002 | Osterhout et al. | 361/679.34 |
| 6,539,336 | B1 | * | 3/2003 | Vock et al. | 702/182 |
| 6,636,158 | B1 | * | 10/2003 | Bando et al. | 340/825.49 |
| 6,640,145 | B2 | * | 10/2003 | Hoffberg et al. | 700/83 |
| 6,674,600 | B1 | * | 1/2004 | Codilian et al. | 360/75 |
| 6,771,447 | B2 | * | 8/2004 | Watanabe et al. | 360/69 |
| 6,781,782 | B2 | * | 8/2004 | Rochat et al. | 360/75 |
| 6,973,535 | B2 | * | 12/2005 | Bruner et al. | 711/112 |
| 7,076,348 | B2 | * | 7/2006 | Bucher et al. | 701/35 |
| 7,161,758 | B2 | * | 1/2007 | Adapathya et al. | 360/69 |
| 2005/0053447 | A1 | * | 3/2005 | Bucher et al. | 411/470 |

* cited by examiner

Primary Examiner — K. Wong
(74) Attorney, Agent, or Firm — Westman, Champlin & Koehler, P.A.

(57) ABSTRACT

A shock protected electronic device comprising a position receiver, an electromechanical device, a position process, and a protect process. The position receiver generates at least one position signal. The motion sensor generates at least one motion signal. The electromechanical device operates in a normal mode and a protect mode. The position process generates position data indicative of a position of the shock protected electronic device based on at least one of the position signal and the at least one motion signal. The protect process generates a protect signal based on the at least one motion signal. The electromechanical device enters the protect mode when the protect process generates the protect signal.

49 Claims, 9 Drawing Sheets

SHOCK PROTECTION FOR ELECTRO-MECHANICAL DEVICES OF HOST DEVICES EMPLOYING INERTIAL NAVIGATION SYSTEMS

RELATED APPLICATIONS

Priority is claimed from U.S. Provisional Patent Application Ser. No. 60/678,418 filed on May 6, 2005, which is incorporated by reference in to its entirety.

TECHNICAL FIELD

The present invention relates to systems and methods of protecting an electromechanical device of a host device from damage caused by external shocks and, more specifically, to shock protection systems and methods for electromechanical devices associated with a host system employing an inertial navigation system.

BACKGROUND OF THE INVENTION

Many electronic devices are manufactured in a portable form to allow the device to be easily and conveniently used at a variety of locations. Currently, many types of portable electronic devices, such as laptop computers, media playback devices, and global positioning systems employ electromechanical devices such as hard disk drives to store data. The use of hard disk drives with other types of electronic devices, such as mobile telephones, digital cameras, digital camcorders, or the like, is likely to increase in the future.

In addition, many portable electronic devices are being provided with location systems that allow a location of the portable electronic device to be determined. For example, global-positioning systems (GPS), laptop computers, and cellular telephones are all examples of devices that currently or soon will incorporate both a location system and an electromechanical device such as a hard disk drive (HDD).

The present application is of particular relevance when used in the context of a cellular telephone containing an integral hard disk drive and an integral positioning system, but may be used with portable electronic devices other than cellular telephones and electromechanical devices other than hard disk drives. Accordingly, while various embodiments of the present invention will be described below in the context of a Cellular telephone containing a location system and an integral hard disk drive, the present invention may be embodied in other forms and used in other environments.

Cellular telephones are often exposed to external shocks, such as when the telephone is accidentally dropped onto or banged into a rigid surface such as a floor, wall, door frame, or the like. Solid state electronics in a cellular telephone are relatively resistant to damage from such shocks, but electromechanical devices such as hard disk drives are highly susceptible to damage when subjected to external shocks, especially while operating.

In particular, a conventional hard disk drive comprises one or more disks that are rotated relative to an actuator arm assembly. Each disk defines first and second surfaces on which tracks are defined, with the tracks being radially spaced from the center of the disk. The actuator arm assembly supports a head above each surface of the disk. The actuator arm assembly further radially moves the head relative to the disk to allow the head to be placed above a desired track during read and write operations.

The distance between each head and the disk surface corresponding thereto is referred to as fly height. Ideally, the fly height is a constant, predetermined value. In practice, however, the fly height can vary based on factors such as imperfections on the disk surface. Hard disk drives employ various active and passive mechanisms to control fly height, but these control mechanisms cannot compensate for variations in fly height due to shocks above a predetermined threshold. Accordingly, if a shock on the hard disk drive exceeds the predetermined threshold, the shock may cause the head to come into contact with the surface of the disk, causing damage to the head and/or the disk surface.

On the other hand, most modern hard disk drives define a park mode in which the head is rigidly held against a predetermined portion of the disk surface or unloaded from the disk surface using a ramp. In the past, hard disk drives defined a landing zone on the disk surface, and, when in the park mode, the head is held against the landing zone portion of the disk surface on which data is not stored. However, most modern hard disk drives define a ramp adjacent to the radially innermost portion (or outermost portion) of the disk surface. In this case, the head is unloaded from the disk surface using the ramp and is prevented from being loaded onto the disk surface using, for example, a magnetic latch, when the hard disk drive is in the park mode. In either case, significantly greater shocks can be tolerated without damage to the hard disk drive when the hard disk drive is in the park mode.

If an imminent shock can be detected, shock protection can be provided by placing the hard disk drive into the park mode in advance of the shock. To this end, certain disk drives have been manufactured with an integral motion detector. The motion detector detects motion of the disk drive that indicates that the disk drive has been dropped and thus that a shock is imminent. When motion indicative of imminent shock is detected, the hard disk drive is placed in the park mode to increase the ability of the hard disk drive to resist shocks without damage.

Providing a hard disk drive with an integral shock protection system is not practical or desirable for a number of reasons. One important reason is that an integral shock protection system increases the costs of the hard disk drive. Given that many hard drives may not be used in a manner that requires additional shock protection, computer manufactures do not want to pass the costs of such protection onto every purchaser of a computer containing a hard disk drive. A significant portion of hard disk drives to be manufactured in the future are, thus, likely to be sold without integral shock protection. Further, in the case of a portable electronic device such as a cellular telephone having a positioning system, providing a hard disk drive with an integral shock protection system can result in duplication of hardware.

The need thus exists for improved systems and methods of protecting electromechanical devices used in portable electronic devices from external shocks.

SUMMARY OF THE INVENTION

The present invention may be embodied as a shock protected electronic device comprising a position receiver, an electromechanical device, a position process, and a protect process. The position receiver generates at least one position signal. The motion sensor generates at least one motion signal. The electromechanical device operates in a normal mode and a protect mode. The position process generates position data indicative of a position of the shock protected electronic device based on at least one of the position signal and the at least one motion signal. The protect process generates a protect signal based on the at least one motion signal. The electromechanical device enters the protect mode when the protect process generates the protect signal.

The invention may also be embodied as a method of shock protecting an electronic device comprising an electromechanical device, a position receiver, a motion sensor, and a position process. Such a method comprises the steps of generating position data based on at least one of a position signal generated by the position receiver and at least one motion signal generated by the motion sensor; generating a protect signal based on the at least one motion signal generated by the motion sensor; and placing the electromechanical device in a protect mode when the protect process generates the protect signal.

DETAILED DESCRIPTION

Figure 1:
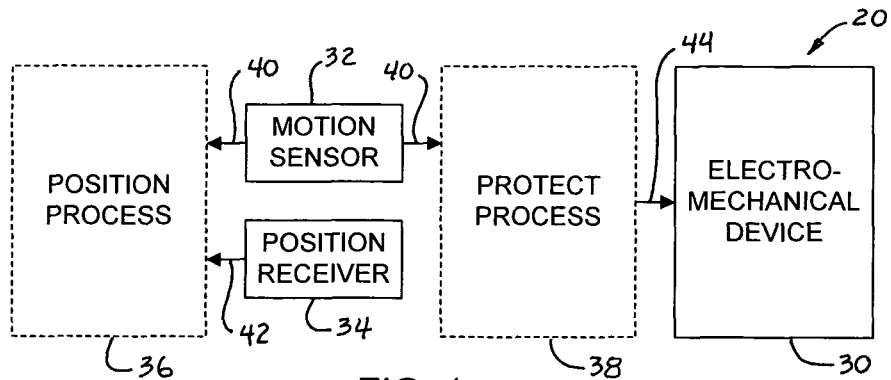
FIG. 1 is a schematic block diagram of an example protected electronic system having an electromechanical device, position hardware, a position processing system, and a protect processing system.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Referring initially to FIG. 1 of the drawing, depicted at 20 therein is an example of a protected electronic device constructed in accordance with, and embodying, the principles of the present invention. The example protected electronic system 20 comprises an electromechanical device 30, a motion sensor 32, a position receiver 34, a position process 36, and a protect process 38. The term "process" as used herein refers to logic, data flow, and/or calculations capable of performing a particular function. Such logic, data flow, and/or calculations are typically, but not necessarily, implemented as software code.

The electromechanical device 30 may be any one of a number of devices that employ moving parts during normal operation but will often be a hard disk drive. The motion sensor 32 is configured to generate at least one motion signal 40 indicative of movement of the entire electromechanical device 30. The position receiver 34 is configured to generate at least one position signal 42 indicative of a location of the electromechanical device 30. The position process 36 is configured to determine a location of the electromechanical device 30 based on at least one of the motion signal 40 and the position signal 42. The motion sensor 32, position receiver 34, and position process 36 are or may be conventional.

The protect process 38 is configured to generate a protect signal 44 based on the motion signal 40 generated by the motion sensor 32. In particular, the protect process 38 monitors the motion signal 40 for signal characteristics that are predetermined to be a precursor to a shock event. When such signal characteristics are present, the protect process 38 generates the protect signal 44. The protect signal 44 is transmitted to the electromechanical device 30, which in response takes protective action. If the electromechanical device 30 is a hard disk drive, the protective action may be to park the head of the hard disk drive.

An example of a signal characteristic that is typically a precursor to a shock event is a signal associated with zero gravity. Zero gravity is commonly associated with a freefall event, and a freefall event is a typical precursor to a shock event. Another signal characteristic that is typically a precursor to a shock event is a signal indicative of a tumbling event. A tumbling event is also often associated with a shock event. Accordingly, if the protect process 38 determines that the motion signal (or signals) indicates a zero gravity situation and/or a tumbling situation, the protect process 38 generates the protect signal 44.

The protected electronic system 20 can be arranged in many different configurations. At a minimum, the motion sensor 32 should be fixed relative to the electromechanical device 30 so that movement of the device 30 is immediately transmitted to the sensor 32. The motion signal 40 generated by the motion sensor 32 thus accurately represents movement of the electromechanical device 30. Further, the motion sensor 32 and the position receiver 34 should both be located together so that the position process 36 generates meaningful location data. The electromechanical device 30, motion sensor 32, and position receiver 34 are thus typically arranged within a common housing. If the protected electronic system 20 is a cellular telephone, the electromechanical device 30, motion sensor 32, and position receiver 34 will all be located within the housing of the cellular telephone.

The position process 36 and protect process 38 are typically, but not necessarily, implemented in software code running on a processor. The term "processor" is used herein to refer to a hardware system comprising a computing device, associated volatile and non-volatile memory, and support circuitry capable of implementing at least the logic, data flow, and/or calculations of the position process 36 and protect process 38 as described herein.

If implemented in software, the position process 36 and protect process 38 may operate on a processor or processors forming part of the protected electronic system 20. If, however, the protected electronic system 20 is connected to a network, the position process 36 and protect process 38 may operate on a processor or processors connected to the protected electronic system 20 across the network. The processors running the position process 36 and protect process 38 thus need not form a part of the protected electronic system 20. In this case, the position motion signal 40 and position signal 42 are communicated across the network to a processor or processors located elsewhere on the network.

The details of several example embodiments of the present invention will now be described in further detail.

Figure 2:
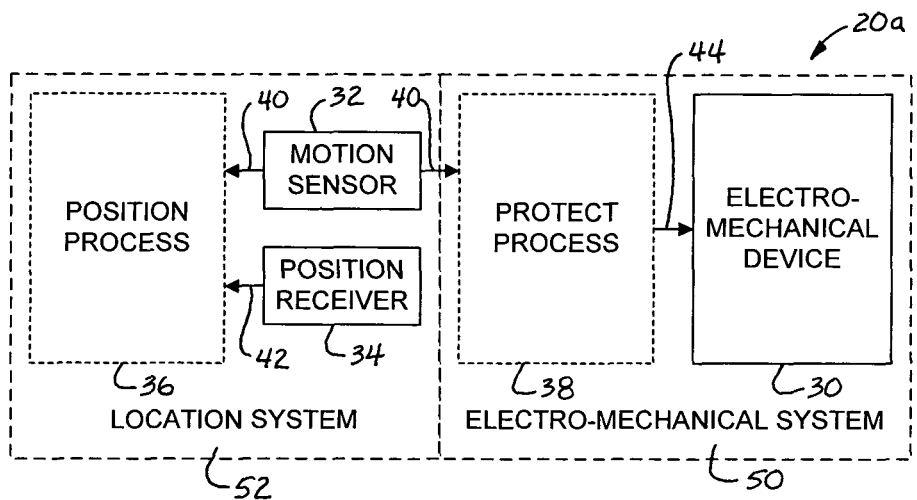
FIG. 2 is a schematic block diagram of a second example protected electronic system having an electromechanical device, position hardware, a position processing system, and a protect processing system included in the electromechanical device.

Referring now to FIG. 2 of the drawing, depicted at 20a therein is a second example of a protected electronic device of the present invention. Like the protected electronic system 20 described above, the system 20a comprises an electromechanical device 30, a motion sensor 32, a position receiver 34, a position process 36, and a protect process 38. In the example system 20a, the electromechanical device 30 forms part of an electromechanical system 50, and the protect process 38 is implemented as part of the electromechanical system 50. The motion sensor 32 and position receiver 34 form part of a location system 52, and the position process 36 is implemented as part of the location system 52.

Figure 3:
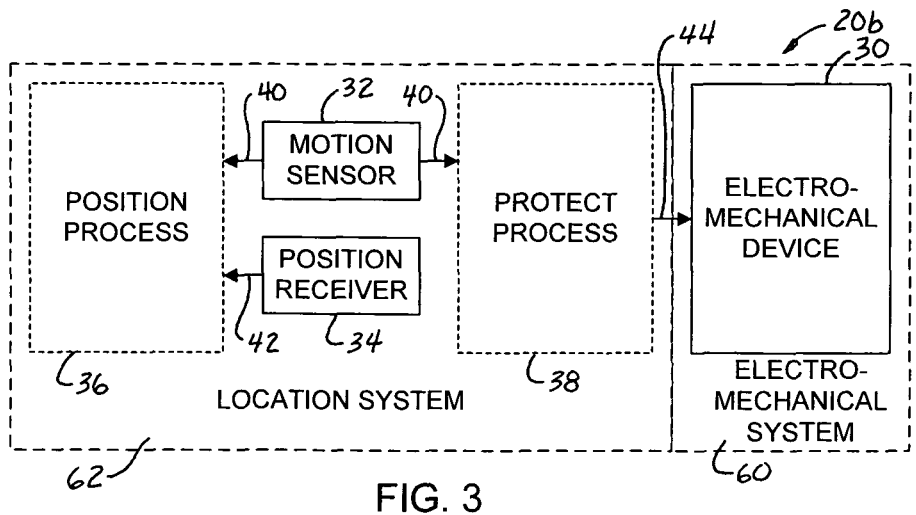
FIG. 3 is a schematic block diagram of a third example protected electronic system having an electromechanical device, a location system, and a protect processing system included in the location system.

FIG. 3 of the drawing depicts a third example of a protected electronic system 20b of the present invention. Like the protected electronic system 20 described above, the system 20a comprises an electromechanical device 30, a motion sensor 32, a position receiver 34, a position process 36, and a protect process 38. In the example system 20b, however, the electromechanical device 30 forms part of an electromechanical system 60, and the motion sensor 32 and position receiver 34 form part of a location system 62. The position process 36 and protect process 38 are implemented as part of the location system 62.

Figure 4:
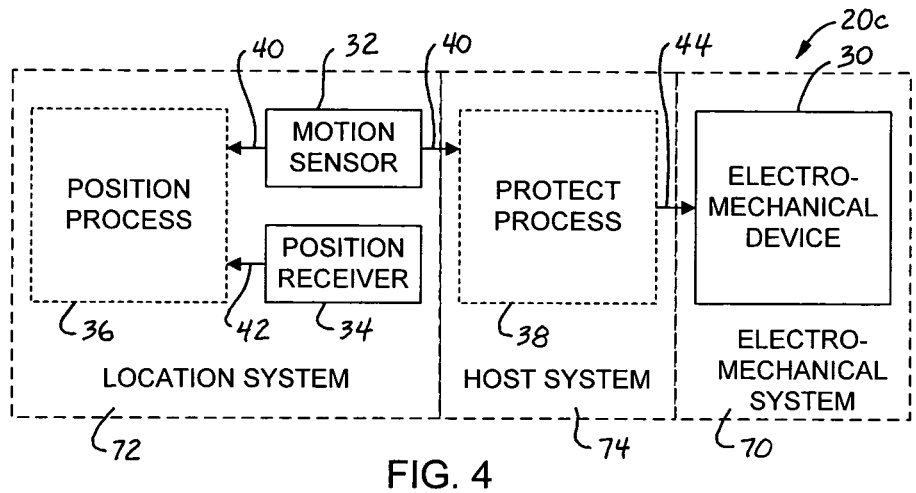
FIG. 4 is a schematic block diagram of a fourth example protected electronic system having an electromechanical device, a location system, a host system, and a protect processing system included in the host system.

FIG. 4 of the drawing illustrates a fourth example of a protected electronic system 20c of the present invention. The system 20c comprises an electromechanical device 30, a motion sensor 32, a position receiver 34, a position process 36, and a protect process 38. In the example system 20c, the electromechanical device 30 forms part of an electromechanical system 70, and the motion sensor 32 and position receiver 34 form part of a location system 72. In addition, the example protected electronic system 20c comprises a host system 74. The position process 36 is implemented as part of the location system 72, and the protect process 38 is implemented as part of the host system 74. The host system 74 may take many forms, such as a cellular telephone, a portable computer, a media playback device, or a global positioning system.

Figure 5:
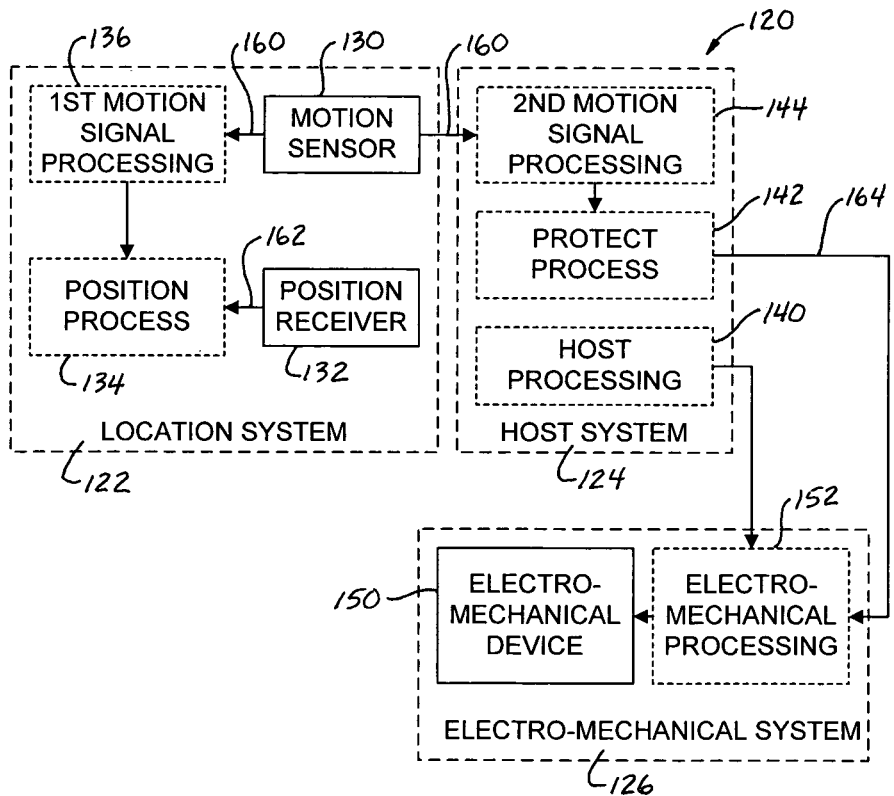
FIG. 5 is a detailed block diagram of an example protected electronic system having an electromechanical device, a location system, and a host system, where a protect processing system is included in the host system.

Referring now to FIG. 5 of the drawing, depicted at 120 therein is another example of a protected electronic device of the present invention. The example protected system 120 comprises a location system 122, a host system 124, and an electromechanical system 126. The location system 122 comprises a motion sensor 130, a position receiver 132, a position process 134, and a first motion signal process 136. The host system 124 comprises a host process 140, a protect process 142, and a second motion signal process 144. The electromechanical system 126 comprises an electromechanical device 150 and an electromechanical process 152.

The host process 140 implements the logic, data flow, and/or calculations of the host system 124. For example, in the case of a cellular telephone, the host process 140 operates in conjunction with hardware components of the host system 124 to implement the telephone features of the host system 124. Similarly, the electromechanical process 152 implements the logic, data flow, and/or calculations of the electromechanical system. The host process 140 and electromechanical process 152 are or may be conventional and will not be described herein in further detail.

The motion sensor 130 generates at least one motion signal 160, and the position receiver 132 generates a position signal 162. The motion signal 160 is sent both to the first motion process 136 and the second motion signal process 144. The signal processes 136 and 144 modify the motion signal 160 to allow the motion signal 160 to be used by the position process 134 and the protect process 142, respectively. The position signal 162 is sent directly to the position process 134.

The motion sensor 130, position receiver 132, and position process 134 also are or may be conventional. The protect process 142 is configured to generate a protect signal 164 based on the motion signal 160 generated by the motion sensor 130 and processed by the second motion signal process 144. As generally described above, the protect process 142 monitors the motion signal 160 for signal characteristics that are predetermined to be a precursor to a shock event. When such signal characteristics are present, the protect process 142 generates the protect signal 164. The protect signal 164 is transmitted to the electromechanical device 150, which in response takes protective action.

Figure 6:
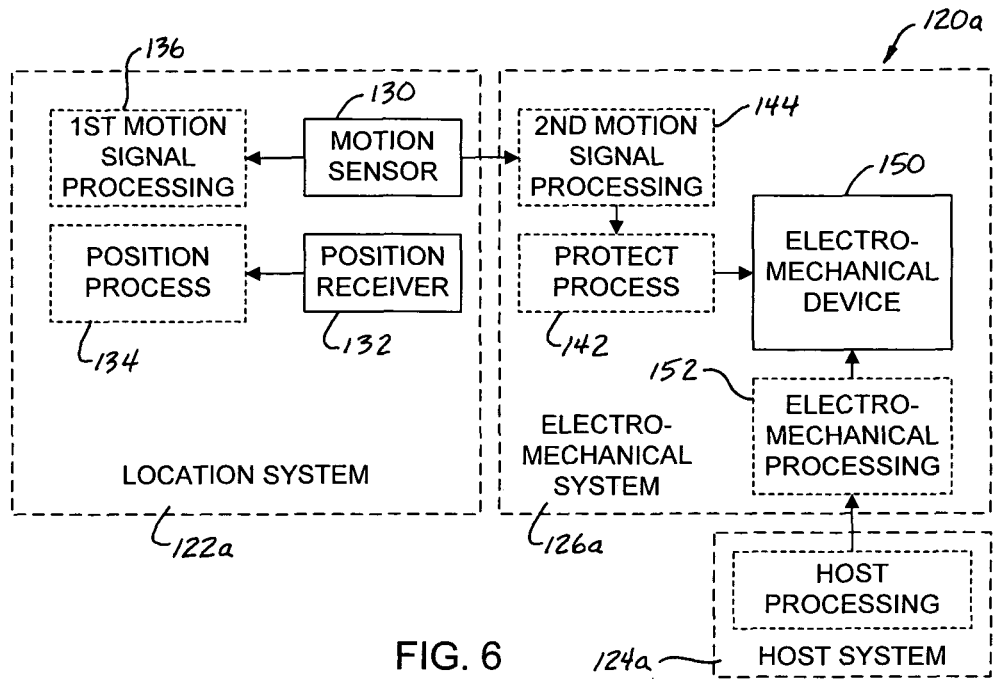
FIG. 6 is a detailed block diagram of an example protected electronic system having an electromechanical device, a location system, and a host system, where a protect processing system is included in the electromechanical system.

Referring now to FIG. 6 of the drawing, depicted at 120a therein is another example of a protected electronic device of the present invention. The example protected system 120a is similar to the protected system 120, but the protect process 142 and the second motion signal process 144 form a part of the electromechanical system 126a instead of the host system 124a.

Figure 7:
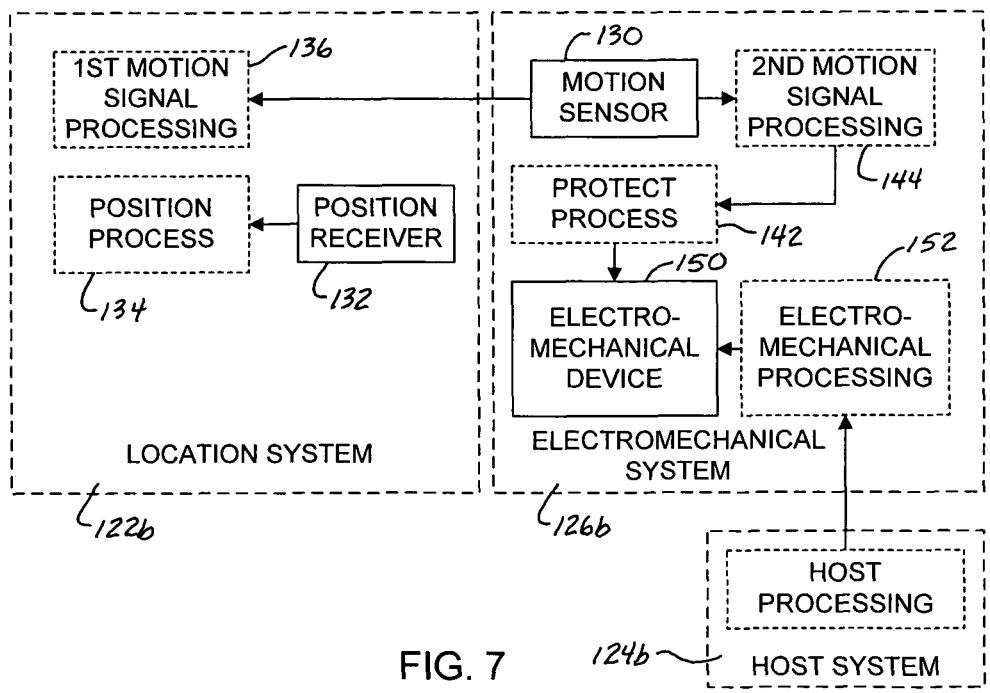
FIG. 7 is a detailed block diagram of an example protected electronic system having an electromechanical device, a location system, and a host system, where a position processing system is included in the location system and a protect processing system is included in the electromechanical system.
Figure 8:
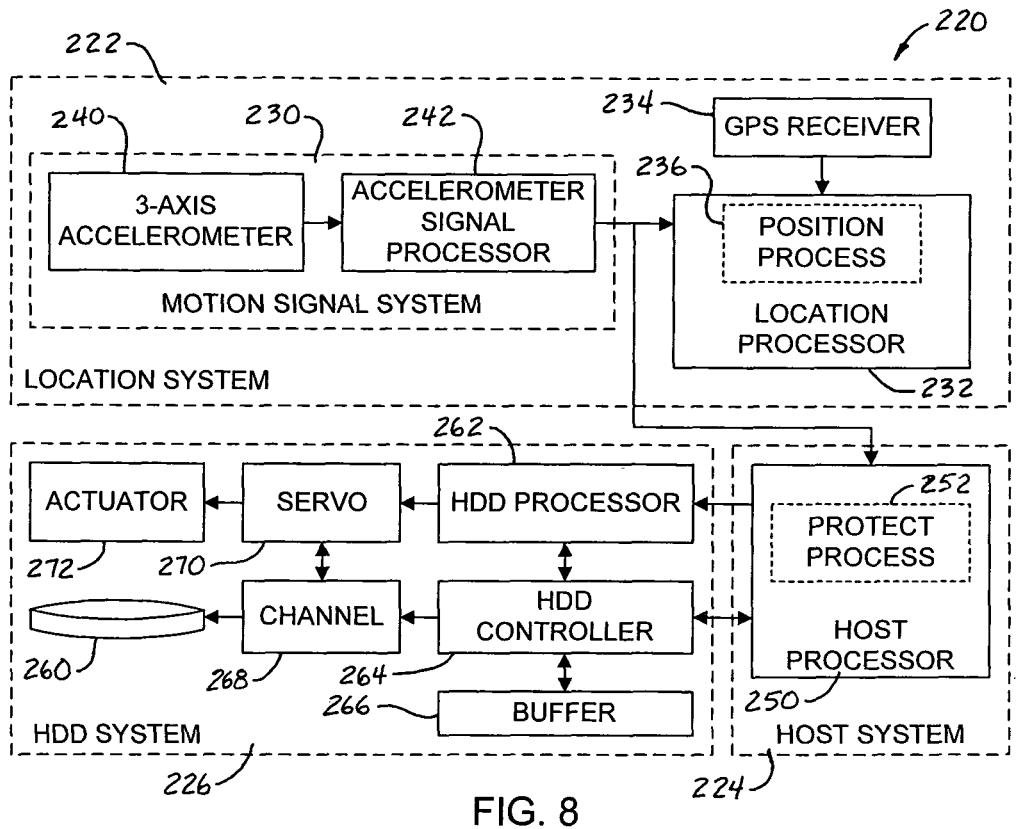
FIG. 8 is a detailed block diagram of an example protected electronic system having a hard disk drive, a location system, and a host system, where a protect processing system is included in the host system.

Referring now to FIG. 7 of the drawing, depicted at 120b therein is another example of a protected electronic device of the present invention. The example protected system 120b is similar to the protected system 120a, but the motion sensor 130 forms a part of the electromechanical system 126b instead of the location system 122b.

Referring now to FIGS. 8-11, depicted therein is yet another example of a protected electronic system 220 of the present invention. The protected electronic system 220 comprises a location system 222, a host system 224, and a hard disk drive system 226.

The location system 222 comprises a motion signal system 230, a location processor 232, a GPS receiver 234, and a position process 236. The location processor 232 runs the position process 236. The motion signal system comprises an accelerometer 240 and an accelerometer signal processor 242. The accelerometer 240 generates a motion signal, and the accelerometer signal processor 242 converts the motion signal into a modified motion signal. The GPS receiver 234 generates a position signal.

Figure 9:
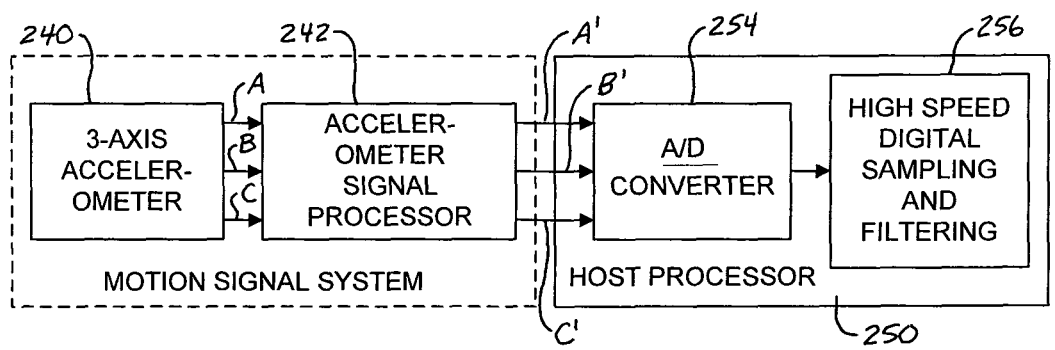
FIG. 9 is a block diagram depicting details of a location system and host processor of the protected electronic system of FIG. 8.

The host system 224 comprises a host processor 250 that runs a protect process 252. Referring for a moment to FIG. 9, the host processor 250 further comprises an A/D converter 254 and a sampling and filtering circuit 256.

The hard disk drive system 226 comprises a disk 260, HDD processor 262, a HDD controller 264, a buffer 266, a channel processing system 268, a servo processing system 270, and an actuator system 272. The hard disk drive system 226 is or may be conventional and will not be described herein in further detail.

Referring again to FIG. 9, it can be seen that the example accelerometer 240 is a 3-axis accelerometer and that the motion signal comprises first, second, and third motion components A, B, and C. The accelerometer signal processor 242 amplifies the signal components A, B, and C to obtain amplified signal components A', B', and C', which are sent to the host processor 250. The A/D converter 254 converts the analog signal components A', B', and C' into a digital signal, and the sampling and filtering circuit 256 processes this digital signal as appropriate for use by the protect process 252.

Figure 10:
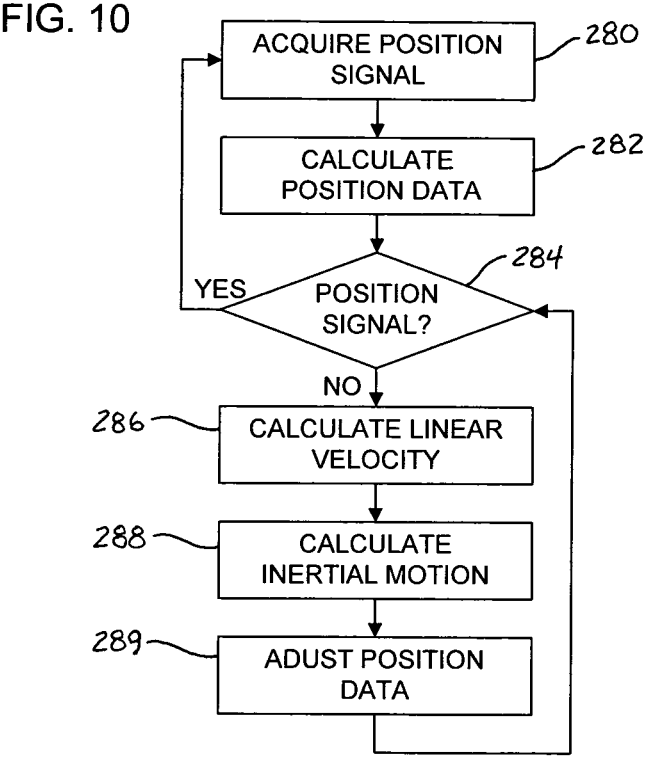
FIG. 10 is a flow chart depicting details of an example position processing system that may be used by the protected electronic systems described herein.
Figure 11:
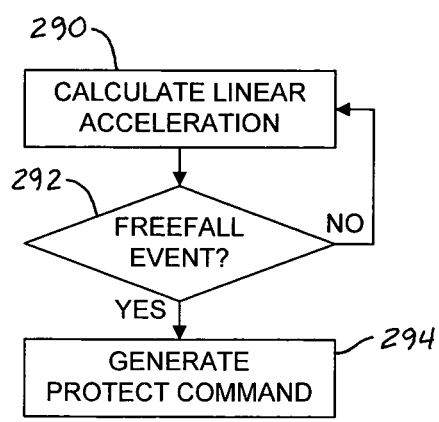
FIG. 11 is a flow chart depicting details of an example protect processing system that may be used by the protected electronic systems described herein.
Figure 12:
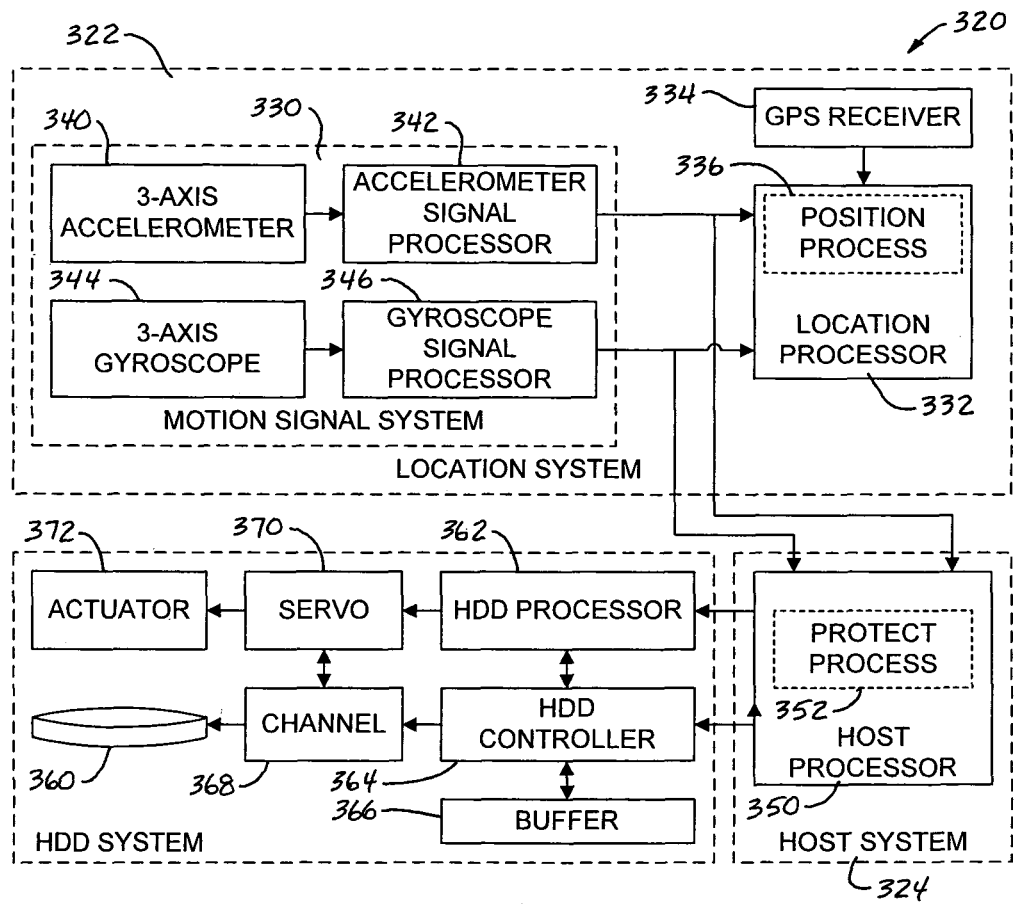
FIG. 12 is a detailed block diagram of an example protected electronic system having a hard disk drive system, a location system, and a host system, where a protect processing system is included in the host system and the location system includes a gyroscope.

FIGS. 10 and 11 depict examples of the logic, data flow, and/or calculations that may be implemented by the position process 236 and the protect process 252. As shown in FIG. 10, the position process 236 acquires a position signal from the GPS receiver at step 280 and calculates position data at step 282. At step 284, the position process 236 determines whether the position signal is available. If so, the position process 236 returns to step 280 and repeats steps 280 and 282. If the position signal is not available, the position process 236 calculates a linear velocity vector of the protected system 220 based on the motion signal at step 286, calculates inertial motion data at step 288, and adjusts the position data at step 289. The process then returns to step 284 and determines whether the position signal is still unavailable.

As shown in FIG. 11, the protect process 252 calculates, based on the motion signal, linear acceleration vector data representing acceleration of the protected system 220 at step 290. The protect process 252 then analyzes the linear acceleration vector data at step 292 to determine whether this data conforms to one or more shock precursor profiles indicative of conditions that are known to be a precursor to a shock event. If not, the protect process 252 returns to step 290 and re-calculates the linear acceleration vector data. If the linear acceleration vector data conforms to one or more shock precursor profiles, the protect process 252 generates a protect command at step 294.

Referring now to FIGS. 12-15, depicted therein is yet another example of a protected electronic system 320 of the present invention. The protected electronic system 320 comprises a location system 322, a host system 324, and a hard disk drive system 326.

The location system 322 comprises a motion signal system 330, a location processor 332, a GPS receiver 334, and a position process 336. The location processor 332 runs the position process 336. As is conventional, the GPS receiver 334 generates a position signal. The motion signal system comprises an accelerometer 340, an accelerometer signal processor 342, a gyroscope 344, and a gyroscope signal processor 346. The accelerometer 340 generates a first motion signal, and the accelerometer signal processor 342 converts the first motion signal into a modified first motion signal. Similarly, the gyroscope 344 generates a second motion signal, and the gyroscope signal processor 346 converts the second motion signal into a modified second motion signal.

Figure 13:
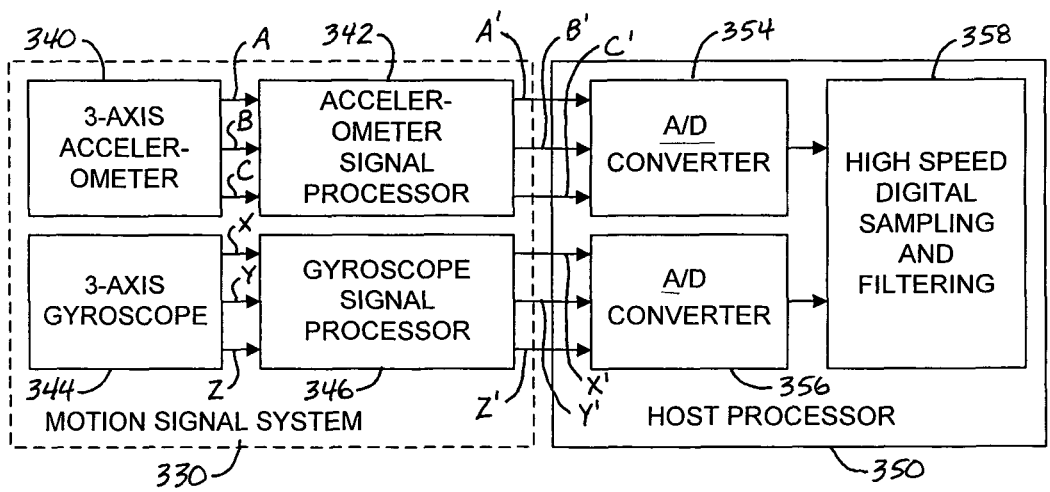
FIG. 13 is a block diagram depicting details of a motion signal system and host processor of the protected electronic system of FIG. 12.

The host system 324 comprises a host processor 350 that runs a protect process 352. Referring for a moment to FIG. 13, the host processor 350 further comprises first and second A/D converters 354 and 356 and a sampling and filtering circuit 358.

The hard disk drive system 326 comprises a disk 360, HDD processor 362, a HDD controller 364, a buffer 366, a channel processing system 368, a servo processing system 370, and an actuator system 372. The hard disk drive system 326 is or may be conventional and will not be described herein in further detail.

Referring again to FIG. 13, it can be seen that the example accelerometer 340 is a 3-axis accelerometer and that the first motion signal comprises components A, B, and C. The accelerometer signal processor 342 amplifies the signal components A, B, and C to obtain amplified signal components A', B', and C', which are sent to the host processor 350. The first A/D converter 354 converts the analog signal components A', B', and C' into a digitized first motion signal, and the sampling and filtering circuit 358 processes this digitized first motion signal as appropriate for use by the protect process 352.

The gyroscope 344 is similarly a 3-axis device, and the example second motion signal comprises components X, Y, and Z. The gyroscope signal processor 346 amplifies the signal components X, Y, and Z to obtain amplified signal components X', Y', and Z', which are sent to the host processor 350. The second A/D converter 356 converts the analog signal components X', Y', and Z' into a digitized gyroscope signal, and the sampling and filtering circuit 356 also processes the processed, digitized gyroscope signal as appropriate for use by the protect process 352.

Figure 14:
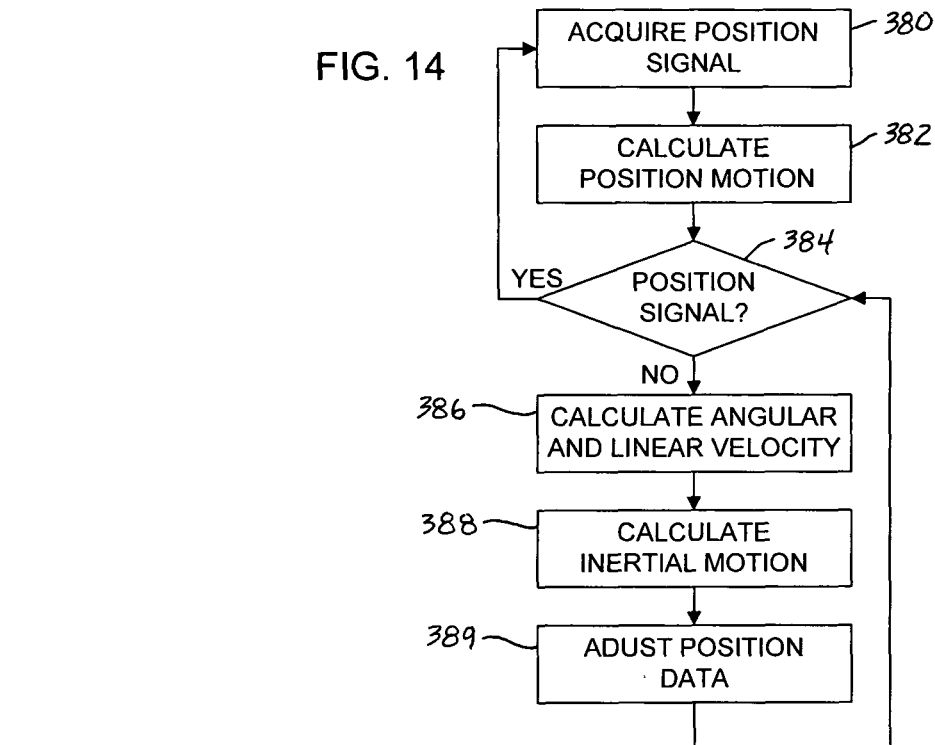
FIG. 14 is a flow chart depicting details of an example position processing system that may be used by the protected electronic system described in FIG. 12.
Figure 15:
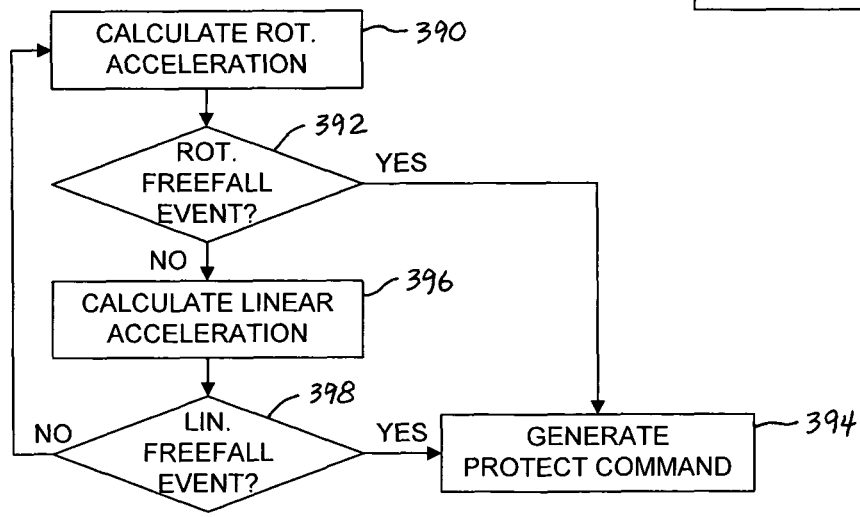
FIG. 15 is a flow chart depicting details of an example protect processing system that may be used by the protected electronic systems described in FIG. 12.

FIGS. 14 and 15 depict examples of the logic, data flow, and/or calculations that may be implemented by the position process 336 and the protect process 352. As shown in FIG. 14, the position process 336 acquires a position signal from the GPS receiver at step 380 and calculates position data at step 382. At step 384, the position process 336 determines whether the position signal is available. If so, the position process 336 returns to step 380 and repeats steps 380 and 382. If the position signal is not available, the position process 336 calculates angular and linear velocity data based on the first and second motion signals at step 386, calculates inertial motion data at step 388, and adjusts the position data at step 389. The process then returns to step 384 and determines whether the position signal is still unavailable.

As shown in FIG. 15, the protect process 352 calculates, based on the second motion signal, rotational acceleration data associated with the protected system 320 at step 390. If at step 392 the rotational acceleration data matches one or more predetermined rotational shock precursor profiles associated with impending shocks, the protect process 352 moves to step 394, at which a protect command is generated.

If the rotational data does not match a rotational shock precursor profile at step 392, the process 352 moves to step 396, at which linear acceleration data representing acceleration of the protected system 320 is calculated. The protect process 352 then analyzes the linear acceleration data at step 398 to determine whether this data conforms to one or more linear shock precursor profiles indicative of conditions that are known to be a precursor to a shock event. If the linear acceleration data conforms to one or more linear shock precursor profiles, the protect process 352 proceeds to step 394 and generates the protect command. If the linear acceleration data does not conform to a linear shock precursor profile, the protect process 352 returns to step 390 and re-calculates the linear acceleration data.

Figure 16:
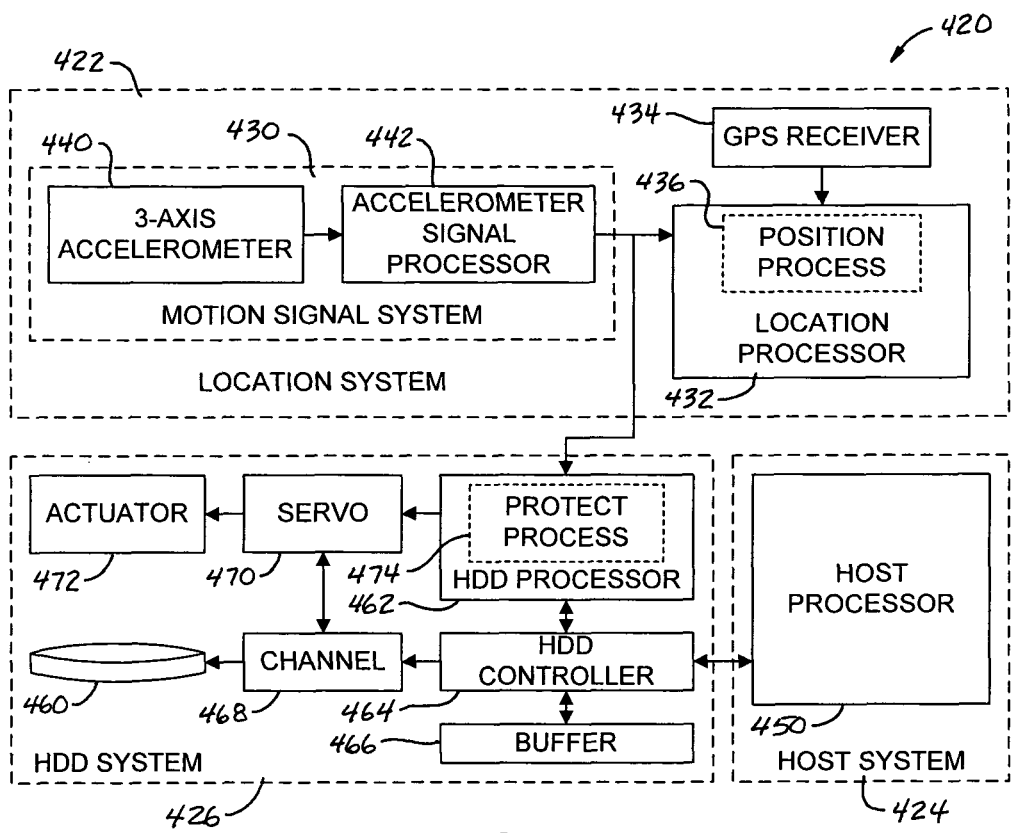
FIG. 16 is a detailed block diagram of an example protected electronic system having a hard disk drive, a location system, and a host system, where a protect processing system is included in the hard disk drive processor.

Referring now to FIG. 16, depicted therein is yet another example of a protected electronic system 420 of the present invention. The protected electronic system 420 comprises a location system 422, a host system 424, and a hard disk drive system 426.

The location system 422 comprises a motion signal system 430, a location processor 432, a GPS receiver 434, and a position process 436. The location processor 432 runs the position process 436. As is conventional, the GPS receiver 434 generates a position signal. The motion signal system comprises an accelerometer 440 and an accelerometer signal processor 442. The accelerometer 440 generates a motion signal, and the accelerometer signal processor 442 converts the motion signal into a modified motion signal.

The host system 424 comprises a host processor 450. The hard disk drive system 426 comprises a disk 460, HDD processor 462, a HDD controller 464, a buffer 466, a channel processing system 468, a servo processing system 470, and an actuator system 472. The HDD processor 462 runs a protect process 474.

Except for the location and operation of the protect process 474, the example system 420 operates in the same basic manner as the system 220 described above. By locating the protect process 474 on the HDD processor 462, the protect process 474 has direct access to the servo processing system 470. Accordingly, the protect process 474 can send the protect signal directly to the servo processing system 470. The servo processing system 470 directly controls the actuator system 472, so the protective measures initiated by the protect command can be implemented in less time than if the protect command is passed through the HDD controller 464.

Figure 17:
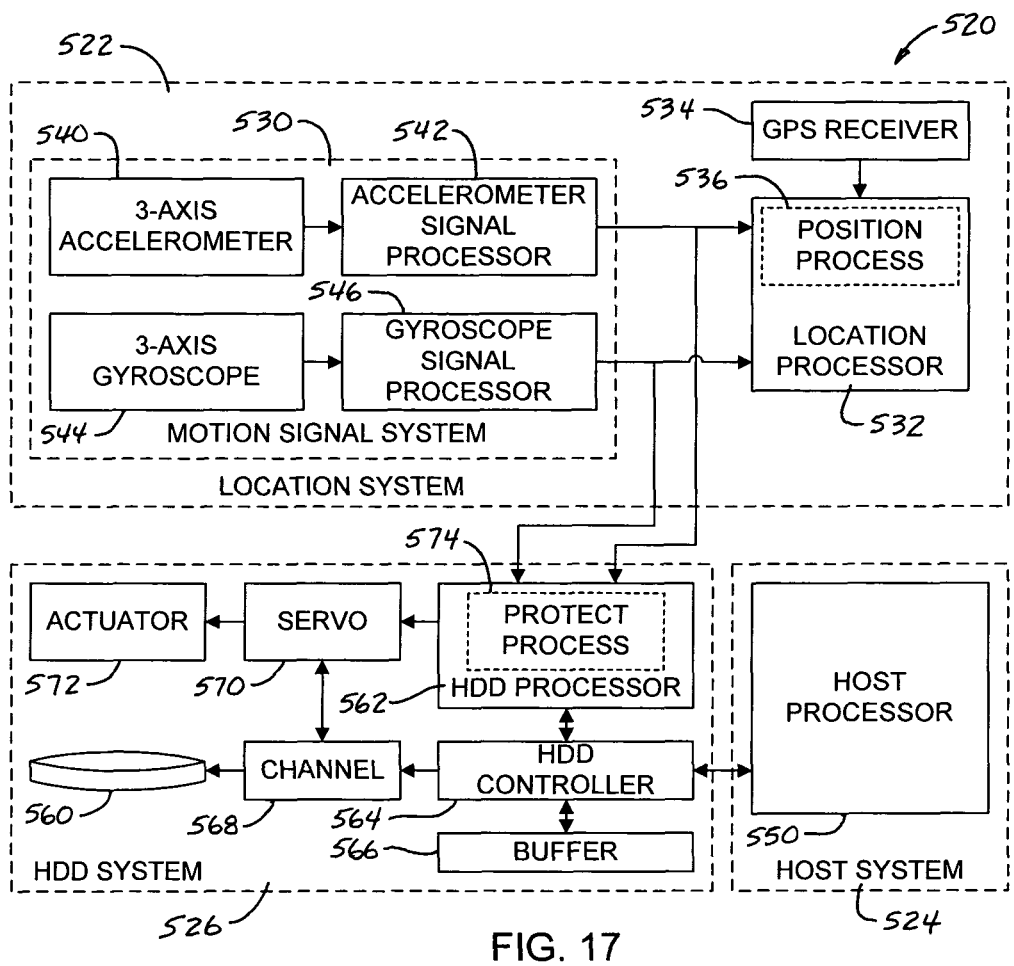
FIG. 17 is a detailed block diagram of an example protected electronic system having a hard disk drive, a location system, and a host system, where a protect processing system is included in the hard disk drive processor and the motion signal system includes gyroscope.

FIG. 17 depicts yet another example of a protected electronic system 520 of the present invention. The protected electronic system 520 comprises a location system 522, a host system 524, and a hard disk drive system 526.

The location system 522 comprises a motion signal system 530, a location processor 532, a GPS receiver 534, and a position process 536. The location processor 532 runs the position process 536. As is conventional, the GPS receiver 534 generates a position signal. The motion signal system comprises an accelerometer 540, an accelerometer signal processor 542, a gyroscope 544, and a gyroscope signal processor 546. The accelerometer 540 generates a first motion signal, and the accelerometer signal processor 542 converts the first motion signal into a modified first motion signal. Similarly, the gyroscope 544 generates a second motion signal, and the gyroscope signal processor 546 converts the second motion signal into a modified second motion signal.

The hard disk drive system 526 comprises a disk 560, HDD processor 562, a HDD controller 564, a buffer 566, a channel processing system 568, a servo processing system 570, and an actuator system 572. The HDD processor 562 runs a protect process 574.

Except for the location and operation of the protect process 574, the example system 520 operates in the same basic manner as the system 320 described above. By locating the protect process 574 on the HDD processor 562, the protect process 574 has direct access to the servo processing system 570. Accordingly, the protect process 574 can send the protect signal directly to the servo processing system 570. The servo processing system 570 directly controls the actuator system 572, so the protective measures initiated by the protect command can be implemented in less time than if the protect command is passed through the HDD controller 564.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A shock protected electronic device comprising:
   a position receiver that generates at least one position signal of the device;
   a motion sensor that generates at least one motion signal;
   an electromechanical device, where the electromechanical device operates in a normal mode and a protect mode;
   a position data generator that receives the at least one motion signal from the motion sensor and generates position data indicative of a position of the shock protected electronic device based on the position signal and the at least one motion signal; and
   a protect signal generator that generates a protect signal based on the at least one motion signal and transmits the protect signal to the electromechanical device, which enters the protect mode in response to receiving the protect signal from the protect signal generator.

2. The shock protected electronic device as recited in claim 1, further comprising a host system.

3. The shock protected electronic device as recited in claim 1, further comprising:
   a location system comprising the position data generator, the position receiver, and the motion sensor; and
   an electromechanical system comprising the electromechanical device and the protect signal generator.

4. The shock protected electronic device as recited in claim 1, further comprising:
   a location system comprising the position data generator, the position receiver, the motion sensor, and the protect signal generator; and
   an electromechanical system comprising the electromechanical device.

5. The shock protected electronic device as recited in claim 1, further comprising:
   a location system comprising the position data generator, the position receiver, and the motion sensor;
   a host system comprising the protect signal generator; and
   an electromechanical system comprising the electromechanical device.

6. The shock protected system as recited in claim 1, further comprising first and second motion signal processing systems for processing the at least one motion signal.

7. The shock protected electronic device as recited in claim 6, in which the location system comprises the protect signal generator.

8. The shock protected electronic device as recited in claim 6, in which the electromechanical system comprises the protect signal generator.

9. The shock protected system as recited in claim 2, in which:
   the electromechanical system is a hard disk drive system comprising a servo processing system and a hard disk drive processor;

the protect signal generator runs on the hard disk drive processor; and the hard disk drive processor is in direct communication with the servo processing system.

10. The shock protected electronic device as recited in claim 1, in which the protect signal generator generates the at least one protect signal based on at least one shock event precursor profile.

11. The shock protected electronic device as recited in claim 1, further comprising a network protocol for allowing communication between the motion sensor and at least one of the protect signal generator and the position data generator.

12. The shock protected electronic device as recited in claim 11, in which the network protocol further allows communication between the protect signal generator and the electromechanical device.

13. The shock protected electronic device as recited in claim 2, in which the host system comprises at least one of a cellular telephone system, a programmable computing system, a media playback system, and a global positioning system.

14. The shock protected device as recited in claim 1, in which the motion sensor comprises an accelerometer.

15. The shock protected device as recited in claim 14, in which the accelerometer generates first, second, and third signals indicative of motion in along first, second, and third axes.

16. The shock protected device as recited in claim 1, in which the motion sensor comprises a gyroscopic sensor.

17. The shock protected device as recited in claim 1, in which the position receiver is a global positioning system receiver.

18. The shock protected electronic device as recited in claim 1, in which the electromechanical device is a hard disk drive.

19. A shock protected electronic device comprising:
a position receiver that generates at least one position signal of the device;
a motion sensor that generates at least one motion signal;
a hard disk drive system comprising a hard disk drive that operates in a read/write mode and a park mode;
a position data generator that receives the at least one motion signal from the motion sensor and generates position data indicative of a position of the shock protected electronic device based on the position signal and the at least one motion signal; and
a protect signal generator that generates a protect signal based on the at least one motion signal, wherein
the protect signal initiates a change of the hard disk drive operation mode from the read/write mode to the park mode.

20. The shock protected electronic device as recited in claim 19, further comprising a host system.

21. The shock protected electronic device as recited in claim 19, further comprising:
a location system comprising the position data generator, the position receiver, and the motion sensor; where
the hard disk drive system further comprises the protect signal generator.

22. The shock protected electronic device as recited in claim 19, further comprising a location system comprising the position data generator, the position receiver, the motion sensor, and the protect signal generator.

23. The shock protected electronic device as recited in claim 19, further comprising:
a location system comprising the position data generator, the position receiver, and the motion sensor; and a host system comprising the protect signal generator.

24. The shock protected system as recited in claim 19, further comprising first and second motion signal processing systems for processing the at least one motion signal.

25. The shock protected electronic device as recited in claim 24, in which the location system comprises the protect signal generator.

26. The shock protected electronic device as recited in claim 24, in which the hard disk drive system comprises the protect signal generator.

27. The shock protected system as recited in claim 19, in which:
the electromechanical system is a hard disk drive system comprising a servo processing system and a hard disk drive processor;
the protect signal generator runs on the hard disk drive processor; and
the hard disk drive processor is in direct communication with the servo processing system.

28. The shock protected electronic device as recited in claim 19, in which the protect signal generator generates the at least one protect signal based on at least one shock event precursor profile.

29. The shock protected electronic device as recited in claim 27, further comprising a network protocol for allowing communication between the motion sensor and at least one of the position data generator and the protect signal generator.

30. The shock protected electronic device as recited in claim 29, in which the network protocol further allows communication between the protect signal generator and at least one of the position data generator and the electromechanical device.

31. The shock protected electronic device as recited in claim 19, in which the host system comprises at least one of a cellular telephone system, a programmable computing system, a media playback system, and a global positioning system.

32. The shock protected electronic device as recited in claim 19, in which the hard disk drive system further comprises:
a servo processing system; and
a hard disk controller in communication with the host processor; where
the protect signal generator directly sends the protect signal to the servo processing system, bypassing the hard disk controller, to place the hard disk drive in the park mode.

33. The shock protected electronic device as recited in claim 19, in which the hard disk drive system further comprises:
a servo processing system;
a hard disk controller in communication with the host processor; and
a hard disk drive processor in communication with the hard disk controller and the servo processing system; where
the hard disk drive processor comprises the protect signal generator, and
the hard disk drive processor directly sends the protect signal to the servo processing system to place the hard disk drive in the park mode.

34. The shock protected device as recited in claim 19, in which the motion sensor comprises an accelerometer.

35. The shock protected device as recited in claim 34, in which the accelerometer generates first, second, and third signals indicative of motion in along first, second, and third axes.

36. The shock protected device as recited in claim 19, in which the motion sensor comprises a gyroscopic sensor.

37. A shock protected device as recited in claim 19, in which the position receiver is a global positioning system receiver.

38. A method of shock protecting an electronic device comprising an electromechanical device, a position receiver, a motion sensor, and a position process, the method comprising the steps of:
- generating position data based on a position signal of the device generated by the position receiver and at least one motion signal generated by the motion sensor;
- generating, by a protect process executed by a processor, a protect signal based on the at least one motion signal generated by the motion sensor; and
- transmitting the protect signal to the electromechanical device, which enters the protect mode in response to receiving the protect signal.

39. The method as recited in claim 38, further comprising the steps of:
- providing a host system; and
- transferring data between the host system and the electromechanical device.

40. The method as recited in claim 38, further comprising the steps of:
- forming a location system comprising the position process, the position receiver, and the motion sensor; and
- forming an electromechanical system comprising the electromechanical device, where the electromechanical system further comprises the protect process.

41. The method as recited in claim 38, further comprising the step of forming a location system comprising the position process, the position receiver, and the motion sensor, where the location system further comprises the protect process.

42. The method as recited in claim 38, further comprising the steps of:
- forming a location system comprising the position process, the position receiver, and the motion sensor; and
- providing a host system comprising the protect process.

43. The method as recited in claim 38, further comprising the step of providing a host system comprising at least one of a cellular telephone system, a programmable computing system, a media playback system, and a global positioning system.

44. An electronic device comprising:
- a position receiver that generates at least one position signal of the device based on information received from a positioning system that is at a location that is remote from the electronic device;
- a motion sensor that generates a motion signal;
- a position data generator that receives the motion signal from the motion sensor and determines a position of the electronic device; and
- a protect signal generator that receives the motion signal from the same motion sensor and generates a protect signal.

45. The electronic device of claim 44 wherein the protect signal is communicated to an electromechanical device, which enters a protect mode in response to receiving the protect signal.

46. The electronic device of claim 45 wherein the position data generator and the protect signal generator are external to the electromechanical device.

47. The electronic device of claim 45 wherein the protect signal generator is a part of the electromechanical device.

48. The electronic device of claim 45 wherein the electromechanical device is a part of the electronic device.

49. The electronic device of claim 45 wherein the motion sensor is external to the electromechanical device.

* * * * *